(12) United States Patent
Janoff et al.

(10) Patent No.: US 6,561,521 B2
(45) Date of Patent: May 13, 2003

(54) METAL-TO-METAL SEAL WITH SOFT METAL INSERT

(75) Inventors: Dwight D. Janoff, Missouri City, TX (US); John C. Vicic, Spring, TX (US); Gregory L. Glidden, Spring, TX (US); Neil C. Crawford, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/819,121

(22) Filed: Mar. 27, 2001

(65) Prior Publication Data

US 2002/0140184 A1 Oct. 3, 2002

(51) Int. Cl.[7] ................................................. F16L 21/05
(52) U.S. Cl. .................... 277/603; 277/606; 277/607; 277/608; 277/609; 277/626; 277/627; 277/630; 277/650; 277/653; 285/334.2; 285/370; 285/917
(58) Field of Search ................................. 277/602, 603, 277/606, 607, 608, 609, 626, 627, 628, 630, 644, 650, 653; 285/370, 334.1, 334.2, DIG. 17

(56) References Cited

U.S. PATENT DOCUMENTS

| | | | | |
|---|---|---|---|---|
| 1,426,724 A | * | 8/1922 | Fyffe ........................ 285/332.1 |
| 3,479,063 A | * | 11/1969 | Raver ........................... 277/614 |
| 3,507,506 A | * | 4/1970 | Tillman, III .................. 277/614 |
| 3,797,835 A | * | 3/1974 | Wehner ......................... 277/614 |
| 3,873,105 A | * | 3/1975 | Wehner ......................... 277/322 |
| 4,109,923 A | * | 8/1978 | Tuckmantel ................... 277/612 |
| 4,470,609 A | * | 9/1984 | Poe .............................. 277/623 |
| 4,471,965 A | * | 9/1984 | Jennings et al. ............. 277/322 |
| 5,944,319 A | * | 8/1999 | Kohlman ...................... 277/314 |
| 6,237,968 B1 | * | 5/2001 | Bohnes ...................... 285/334.2 |

FOREIGN PATENT DOCUMENTS

WO    WO 01/11273 A1    2/2001

* cited by examiner

Primary Examiner—Anthony Knight
Assistant Examiner—Vishal Patel
(74) Attorney, Agent, or Firm—James L. Jackson; Andrews & Kurth, LLP (57) ABSTRACT

An annular metal-to-metal sealing system, for use in wellhead systems and having many other uses, has a metal member defining an annular internal or external sealing surface for which sealing is intended. An annular seal body composed of high strength metal material is positioned in concentric relation with the annular sealing surface and is sufficient flexible to become spring loaded, typically during assembly, for continuous application of a spring force. The annular seal body defines one or more annular seal retainer grooves each having an annular soft metal sealing insert therein, with a portion thereof exposed for sealing engagement with the annular sealing surface. The spring loaded characteristic of the annular seal body applies constant force to maintain the soft metal seal insert in constantly energized sealing relation with the annular sealing surface and maintains effective sealing even when dimensional changes to the sealing surface occur due to temperature or pressure changes.

21 Claims, 4 Drawing Sheets

METAL-TO-METAL SEAL WITH SOFT METAL INSERT

BACKGROUND OF THE INVENTION

1. Field of the Invention

The present invention relates generally to annular metal-to-metal seals for establishing pressure tight sealing engagement with one or more annular metal components. The present invention is particularly applicable for use when tubular elements are positioned end-to-end in a manner defining a joint therebetween, with the metal-to-metal seal assembly having an elastic component providing a joint seal having a substantially constant radial sealing force. More particularly, the present invention concerns an annular sealing assembly permitting the use of a high strength seal carrier body to which is retained an annular seal insert composed of soft, corrosion resistant metal which is sufficiently deformable by seal activating force of the seal carrier body to conform to the surface geometry and finish of a sealing surface and thus establish an efficient high pressure seal therewith.

2. Description of the Prior Art

A metal-to-metal seal is described as follows in U.S. Pat. No. 4,471,965, commonly assigned herewith: A metal-to-metal sealing system including an annular metallic seal element having a sealing lip with a sealing face of round or curved, as distinguished from annular or flat, cross-sectional configuration, and a cylindrical metallic surface against which the sealing lip presses in a fluid-tight relationship. The cylindrical surface has a lead-in chamber on at least one end to facilitate installation of the seal element into an interference fit against the cylindrical surface, and that surface has sufficient axial length to accommodate relative longitudinal movement between it and the sealing lip as these metallic elements expand and contract in response to changes in temperature. Thus under normal operating conditions such as those existing at times other than during a fire, the seal system functions as a pre-load metal-to-metal seal, and when subjected to a fire or other greatly elevated temperature the interference fit assures that a fluid-tight seal is maintained even though significant longitudinal or radial movement between the sealing lip and the cylindrical surface occurs. Furthermore, during cool down from high temperatures the integrity of the seal remains intact. The result is an effective and reliable metal-to-metal sealing system which provides fluid-tight pressure control over a very wide temperature range, for example for 1200° F. to minus 75° F., and which can be satisfactorily employed in wellhead equipment as well as other applications where varying temperatures and/or pressures may be encountered.

Current rigid metal sealing technology, such as Straight Bore Metal Seals (SBMS), and FX Bonnet gaskets, and RX, BX and AX gaskets require higher strength alloys to provide structural integrity and sealing force. These types of seals are widely used in gate valve bonnets, surface and subsea connectors, flowbores and generally throughout wellhead equipment. The strength requirements of these alloys can be up to 120,000 psi yield. These seals work by plastically deforming a small area into a smooth opposing surface. The seal contact area is generally small, and these seals are generally (with a few exceptions), not reusable. Often, due to corrosion requirement, high strength nickel alloys are selected for these seals. These seals may be sensitive to surface finish, installation damage and galling.

OBJECTS OF THE INVENTION

A primary object of this invention is to provide a high performance and low cost metal-to-metal sealing assembly for use in high pressure seal applications including straight bore metal seal (SBMS) of the nature set forth in U.S. Pat. No. 4,471,965 and further capable of being employed as rough casing metal seals (RCMS), FX bonnet gaskets, RX, BX, AX and other currently used metal-to-metal seal designs.

SUMMARY OF THE INVENTION

A novel concept for high-pressure, metal-to-metal sealing which employs a high strength metal seal body or carrier which facilitates application of spring energy or preload force to a soft metal insert carried by the seal body to accomplish high pressure metal-to-metal sealing even under conditions of poor surface finish or irregular sealing surface geometry. The present invention has application to rigid metal-to-metal seal technology including Straight Bore Metal Seals, FX Bonnet Gasket Seals, RX, BX, AX gaskets and others. The present invention represents an improvement to the High Pressure Fire Resistant Seal set forth in U.S. Pat. No. 4,471,965. The concept of the invention involves separating the structural element (body) from the sealing element (soft metal circumferential insert). Seal designs using this technology employ one or more soft metal inserts that are installed by pressing, shrinking or other retention mechanisms on a higher strength seal body or carrier. The higher strength seal body elastically deforms and provides a spring energy characteristic to activate the seal, plastically deforming the soft metal circumferential seal insert when installed. The high strength seal body also confines and protects the soft metal circumferential sealing element against pressure and mechanical abuse. This type of seal increases contact area, allows lower alloy materials (such as 410 stainless steel, 8630, or 4130 steel) to be used for the body of the seal, prevents galling, and also allows the soft metal seal inserts to be replaced, thus enabling reuse of seal bodies. The soft metal circumferential insert will also allow wider machining tolerances, and seal against surfaces that have defects, such as scratches. This seal design may also be tolerant to slightly oval shaped seal bores. The sealing concept of the present invention represents an improvement over metal seals that simply have a soft coating on the surface or require the soft metal to be welded to the high strength component. Coatings have limited wear/corrosion life and cannot fill large defects in the sealing area. Welding the soft metal to the high strength component adds complexity, expense, and limits material selection and may preclude reuse of the seal.

Current high pressure metal sealing technology, such as Straight Bore Metals Seals (SBMS, described in U.S. Pat. No. 4,471,965), Rough Casing Metal Seals, FX Bonnet gaskets, RX, BX and AX seals require higher strength alloys to provide sealing force and structural integrity. These types of seals are widely used in gate valve bonnets, surface and subsea connectors, flow bores and generally throughout a wide range of wellhead equipment for the petroleum industry. The strength requirements of these alloys can be up to 120,000 psi yield. These seals function by plastically deforming a small annular area of a seal element or projection into a smooth opposing annular sealing surface. The seal contact area is generally small, and these seals are generally (with a few exceptions), not reusable. Often, due to corrosion requirements, high strength corrosion resistant alloys (CRAS) are selected for these seals, thus causing the seals to be of considerable expense. Especially if the seals can only be installed once and then discarded, the impact of seals cost is significant. Using higher strength body of a less expensive material, with a soft metal insert made from a more corrosion resistant material, will improve performance and reduce costs in metal-to-metal sealing. In addition to being reusable, the soft metal insert will allow interacting seal components to have wider machining tolerances, enabling sealing against sealing surfaces that have defects, such as scratches or poor finish. Currently technology requires that the sealing surfaces be of 32 microinch RMS quality or better. The soft metal seal inserts of the present invention will function efficiently even when the surface finish of the sealing surfaces is of less than that being typically required at the present time.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention and are therefore not to be considered limiting of its scope, for the invention may admit to other equally effective embodiments.

In the Drawings.

DETAILED DESCRIPTION OF PREFERRED EMBODIMENT

Figure 1:
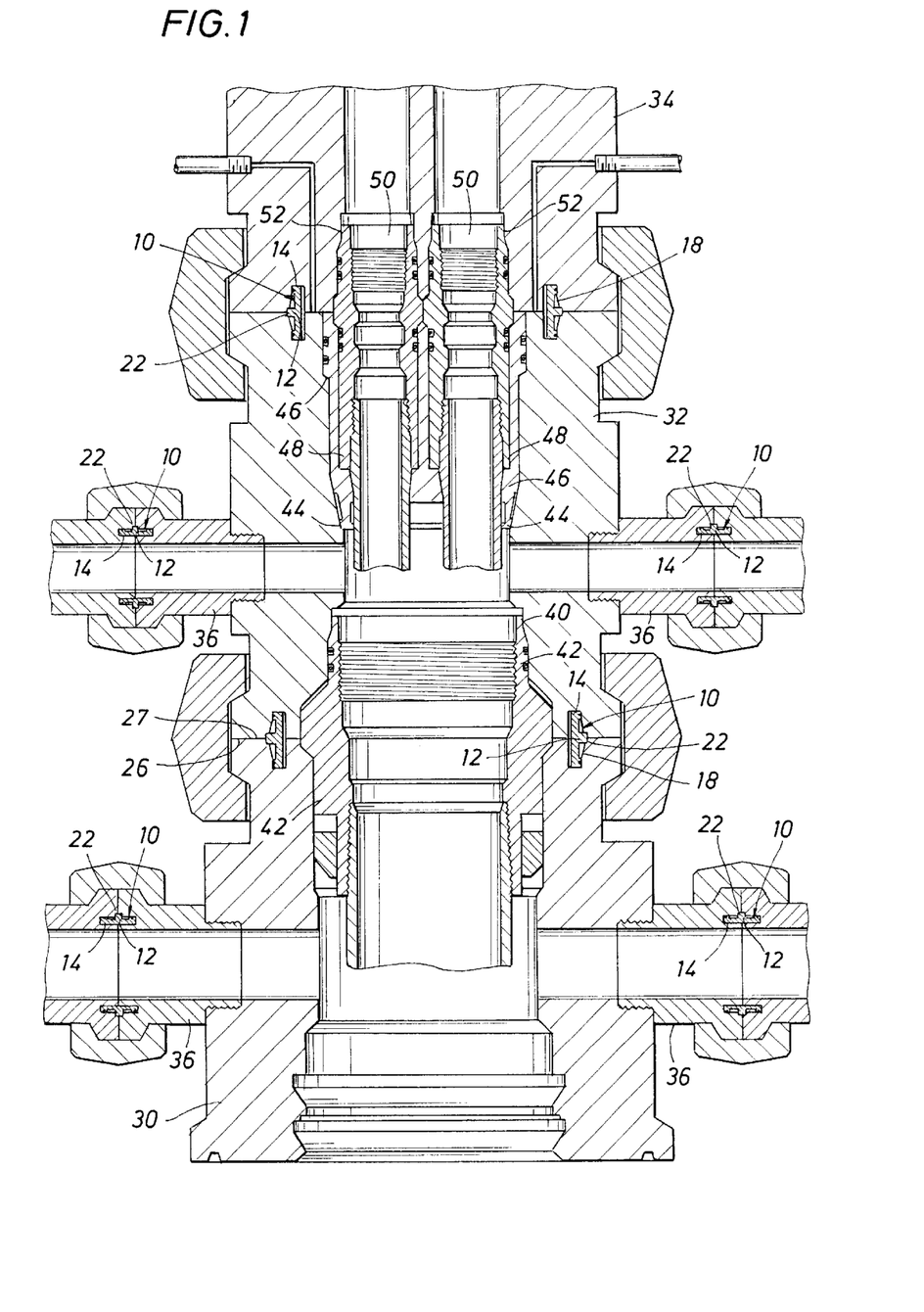
FIG. 1 is a fragmentary vertical section of a wellhead assembly for an oil or gas well, showing a number of uses of a metal-to-metal sealing system embodying the principles of the present invention.
Figures 2, 3:
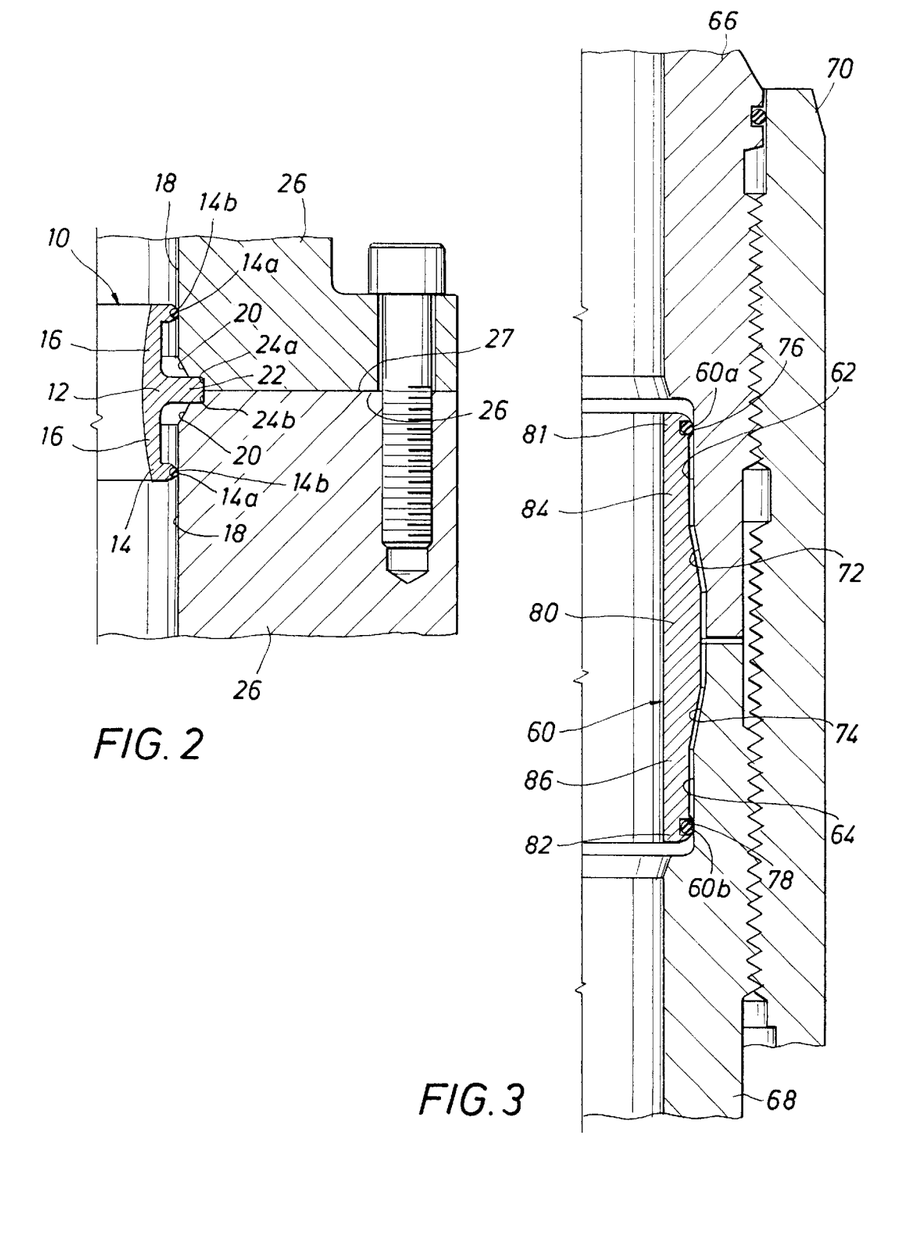
FIG. 2 is a fragmentary section, on an enlarged scale, of a metal-to-metal sealing system according to the present invention employed to provide a metal-to-metal seal between a valve bonnet and a valve body, or between two line flanges or other flanged annular elements.
FIG. 3 is an enlarged fragmentary section of a metal-to metal seal according to the present invention between two pipes interconnected by an external pipe coupling.

Referring now to the drawings and first to FIGS. 1 and 2, a metal-to-metal sealing system embodying the principles of the present invention is shown to be provided for sealing a number of joints of a wellhead or conduit assembly. The metal-to-metal sealing system comprises an annular metal seal body element shown generally at 10 having an annular base portion 12 which defines at least one annular sealing lip 14 projecting radially toward and establishing metal-to-metal sealing engagement with an annular surface 18 which may be a tapered surface as shown in FIG. 1 or a cylindrical surface as shown in FIG. 2.

As is shown in greater detail in FIG. 2, the annular metal seal body 10 of the metal-to-metal sealing system has an annular soft metal sealing insert 14a, being supported with an insert groove of the annular sealing lip 14 and defining an annular sealing surface 14b. The annular sealing surface 14b may be of curved cross-sectional configuration, cylindrical cross-sectional configuration or any other suitable cross-sectional configuration without departing from the spirit and scope of the present invention. As is also shown in FIG. 2, the annular seal body of the metal-to-metal sealing system also defines one or more flexible annular intermediate portions 16 being integral with and extending from the annular base portion 12 and having the annular sealing lip 14 with its soft metal insert 14a projecting therefrom. The flexible annular intermediate portions 16 provide the annular seal body with a spring-like characteristic, so that the flexible annular intermediate portions 16 become flexed and thus preloaded during assembly and thus continuously urge the annular sealing lip with its soft metal insert against an annular sealing surface to maintain interference sealing therewith. The annular seal body 10 is adapted to be disposed in substantially concentric relation with a member 26, such as a tubular member of a wellhead assembly, which member defines at least one annular sealing surface 18 against which the annular sealing insert 14a is pressed in an interference fit relationship when the annular seal body is in functional position. A lead-in chamfer 20 on the cylindrical metal surface or wall 18 provides a means to install the annular metal seal body 10 into its illustrated functional position and to accomplish flexing and preloading of the annular seal body 10, and particularly its flexible annular intermediate portions 16 to ensure its spring-like forcible metal-to-metal sealing engagement with the cylindrical surface 18. The cylindrical surface 18 is designed to have an axial length that is adequate to ensure that the sealing face of the soft metal insert is always in metal-to-metal sealing contact with the annular surface 18 regardless of relative movement therebetween in response to temperature fluctuations or dimensional changes responsive to pressure. During assembly, the lead-in chamfer reacts with the soft metal seals 14a and the annular sealing projections to cause preloading of the intermediate sections 16 so that the intermediate sections become flexed for continuous application of spring force to the annular sealing lips 14 to maintain the soft metal sealing inserts of the annular sealing lips in interference sealing with the annular sealing surface 18 of the member 26.

In the embodiment shown in FIG. 2, the annular seal body 10 also has a central web portion 22 that extends radially from the base portion 12 to fit into relieved areas 24a and 24b in the adjacent faces 26 and 27a of annular flanges or other such structures, defining members for properly positioning the annular seal body at the joint between the adjacent faces and ensuring its retention in that location. As shown in FIG. 1, the flanges or other structures defining the adjacent faces 26a and 27a can be components of a casing head 30, a tubing head 32, a block valve 34, annulus outlets 36 or to a wide variety of other structures where metal-to-metal sealing with internal or external annular surfaces is desired.

As further indicated in FIG. 1, the metal-to-metal sealing system of the present invention also can be utilized in a wellhead as (1) an annulus seal 40 between a mandrel casing hanger 42 and the tubing head 32, (2) a bushing seal 44 between an annular hanger bushing 46 and the tubing head 32, (3) an annulus seal 48 for tubing hanger couplings 50 in a dual tubing string completion system and (4) an extended neck hanger seal as shown at 52.

Since the annular sealing face of the soft metal insert of the annular sealing lip is relatively narrow, and may be of rounded cross-sectional configuration and is significantly softer than the cylindrical sealing surface, i.e., from about $1/5^{th}$ to about $1/3^{rd}$ the yield stress of the elastic component of the seal, it will not cause damage to the cylindrical sealing surface against which it is pressed when the annular sealing body is in functional position with respect to the cylindrical sealing surface. This small dimensioned sealing face also permits minor axial misalignment between the sealing element and cooperative cylindrical surface, such as for example between a tubing hanger and the adapter element, to be accommodated.

Tests on wellhead equipment utilizing a metal-to-metal sealing system having a soft metal sealing insert, according to the teachings of the present invention, have shown that the surface finish at the area of contact between the seal element and the cylindrical surface can be as rough as 125 microinches R.M.S., without jeopardizing the fluid tightness of the seal. This advantage contrasts significantly with the highly polished surfaces required in some other metal-to-metal sealing systems, and provides cost reduction opportunities in the manufacturing process. A seal that is an example of the described design passed API PR2, and FMC 500 cycle endurance testing. Testing was done at 5000 psi between −75° F. and 450° F.

Additional advantages provided by the present invention include (1) the fact that the cylindrical configuration of the surface against which the sealing surface of the soft metal sealing element is pressed is substantially easier to manufacture than surfaces of other configurations, such as conical, heretofore employed in other metal-to metal sealing systems, and (2) no special bolting or clamping arrangements are necessary.

FIG. 3 illustrates a dual metal-to-metal seal system according to the teachings of the present invention, wherein an annular metal sealing element, shown generally at 60, is provided with two axially spaced outer circumferential annular sealing lips 60a and 60b being integral therewith and projecting radially outwardly therefrom. The sealing lips 60a and 60b are provided for metal-to-metal sealing engagement with annular inwardly facing annular sealing surfaces 62 and 64 of pipe ends 66 and 68 that are secured in assembly by an internally threaded pipe coupling 70. The internal end surfaces 62 and 64 of the pipe ends are of cylindrical configuration and are intersected by annular internal chamfered surfaces 72 and 74 which serve as lead-in chamfers during installation of the annular metal sealing element 60. The annular sealing lips 60a and 60b each define annular seal insert recesses receiving annular soft metal sealing inserts 76 and 78 which project from the respective seal insert recesses for sealing contact with the respective annular sealing surfaces 62 and 64. The annular metal sealing body 60, as shown in cross-section in FIG. 3, tapers from a relatively thick and substantially rigid generally cylindrical center section 80 to respective annular end sections 81 and 82 thereof so as to define flexible intermediate sections 84 and 86. The flexible intermediate sections are flexed radially inwardly as, during assembly, the annular sealing lips 60a an 60b and the soft metal inserts 76 and 78 traverse the chamfered surfaces 72 and 74 in progress to the cylindrical sealing surfaces 62 and 64. The force of assembly being applied to the flexible intermediate sections 84 and 86 of the annular seal body 60 causes radial flexing of the intermediate sections and thus causes the flexible intermediate sections to become spring loaded or preloaded. This feature enables the annular sealing lips and their soft metal inserts 76 and 78 to maintain interference sealing with the annular sealing surfaces 62 and 64 even though the respective pipe ends may change in dimension due to temperature changes, pressure changes, etc. Thus, the seal 60 employs a high strength, elastically deformable metal body to provide energizing force, and soft metal sealing inserts to provide the sealing mechanism. The soft metal of the annular sealing inserts allows for much higher sealing interference, and also permits effective sealing on a sealing or seating pocket surface that might have surface defects due to poor quality machining or surface damage.

Figure 4:
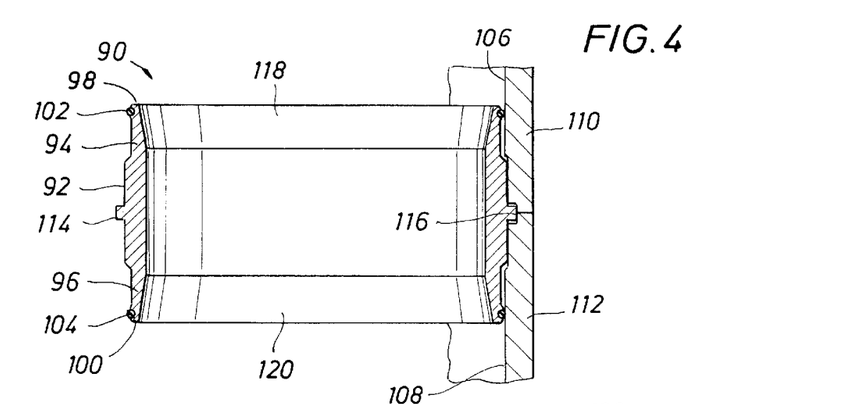
FIG. 4 is a sectional view of an annular seal body embodying the principles of the present invention.
Figure 5:
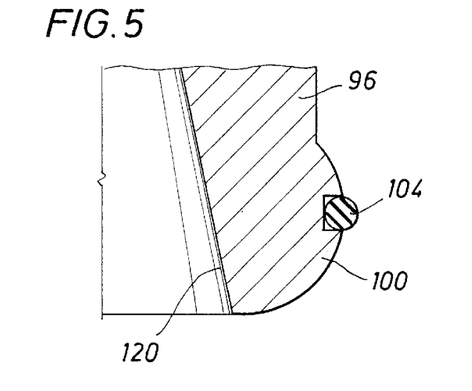
FIG. 5 is a fragmentary sectional view of an end portion of the annular seal body of FIG. 4 showing an annular seal groove formed in an annular sealing projection or lip thereof and further showing a soft metal sealing element located within the annular seal groove.

Referring now to FIGS. 4 and 5, an annular sealing element embodying the principles of the present invention and being shown generally at 90, defines an annular body section 92 of generally cylindrical outer peripheral configuration and having integral intermediate flexible sections 94 and 96 integral therewith. The intermediate body sections have annular sealing lips 98 and 100 projecting radially outwardly therefrom and each sealing lip defining an annular seal insert groove. Annular soft metal sealing elements 102 and 104 are located within the respective annular seal insert grooves and project radially outwardly beyond the respective annular sealing lips 98 and 100 for sealing contact with respective annular sealing surfaces 106 and 108 of tubular elements 110 and 112. The annular seal body 92 is further provided with an annular outer peripheral web 114 which is received within an annular seal locating recess 116 that is cooperatively defined by the abutting ends of the tubular elements. The intermediate sections 94 and 96 are rendered more flexible as compared with the central section 92 by virtue of tapered end surfaces 118 and 120, thus permitting flexing and spring loading of the flexible intermediate sections by reaction with the internal surfaces of the tubular elements during assembly.

Figure 6:
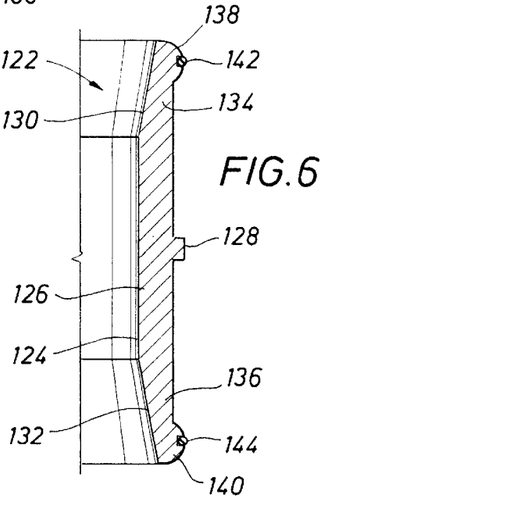
FIG. 6 is a partial sectional view of an annular seal body having a soft metal sealing insert located in annular end grooves thereof and representing an alternative embodiment of the present invention.

FIG. 6 illustrates a smooth bore metal seal shown generally at 122 having an annular seal body 124 defining a generally cylindrical center section 126 and having an annular seal locating web 128. The outer periphery of the annular seal body 124 is tapered from the central body section to the respective ends thereof as shown at 130 and 132, thus defining flexible intermediate sections 134 and 136. The respective axial ends of the annular seal body 122 each define annular sealing lips 138 and 140, each in the form of an annular sealing lip or projection having an annular sealing insert groove therein. Annular soft metal sealing inserts 142 and 144 are located within the respective annular seal insert grooves and project from the grooves, with an annular sealing portion thereof disposed for sealing engagement with an annular sealing surface of a tubular element or an annular sealing surface for which sealing is desired. The annular sealing lips 138 and 140 may have a curved or rounded cross-sectional configuration as shown, or in the alternative may define a more flattened annular surface in which the annular seat insert element is received. The annular sealing lips may also have any other suitable geometry, such as generally elliptical, generally triangular or rectangular if desired and the annular seal groove may have any suitable cross-sectional configuration, including generally rectangular as shown in FIG. 5, dove tailed or other undercut configuration to provide for retention of the annular soft metal sealing elements.

Figure 7:
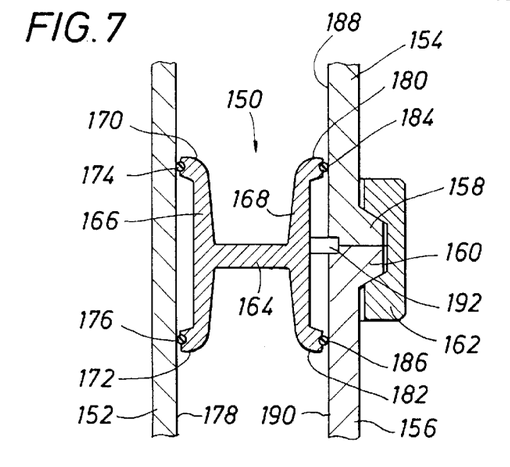
FIG. 7 is a sectional view of an annular sealing assembly representing an embodiment of the present invention and having four annular sealing lips, each being provided with an annular soft metal sealing insert.

FIG. 7 illustrates an annular sealing element shown generally at 150 which may be referred to as an "H" seal and which is useful for sealing with an internal cylindrical element 152 which is disposed in substantially concentric, spaced relation within abutting tubular members 154 and 156. Though not necessary, the tubular members are shown to have tapered connection flanges 158 and 160 that are retained in assembly by a clamp ring 162. The annular sealing element 150 defines a central web 164 to which is integrally connected a pair of annular seal body members 166 and 168. The annular seal body member 166 is of generally cylindrical configuration and defines annular sealing lips 170 and 172 at respective axial ends thereof. The annular sealing lips each define annular seal retention grooves having annular soft metal sealing elements 174 and 176 located therein for interference sealing with the outer cylindrical surface 178 of the internal cylindrical element 152. Likewise, the annular seal body member 168 is also of generally cylindrical configuration and defines annular sealing lips 180 and 182 each having annular seal retainer grooves defined therein and having annular soft metal seals 184 and 186 located within the respective seal grooves, with annular portions thereof projecting from the seal grooves and disposed in interference sealing engagement with the internal annular surfaces 188 and 190 of the pipe ends 154 and 156. An annular positioning web 192 projects radially from the central portion of the annular seal body member 168 and, in operative position, is located within an annular seal location recess that is cooperatively defined by the joint geometry of the abutting pipe ends 154 and 156.

The annular seal body members 166 and 168 are sufficiently flexible that they yield or flex typically during assembly of the annular seal 150 with the tubular member 152 and the pipe ends 154 and 156. Thus, when in sealing assembly, the annular seal body members apply continuous spring force to maintain the annular soft metal seal elements in interference sealing engagement with the respective annular surfaces. This feature enables the seal to maintain its effective sealing capability even though the annular members change in dimension due to temperature or pressure fluctuations. Also, the soft metal seal members will be deformed by the spring force and the force of assembly and will essentially fill surface imperfections of the cylindrical surfaces and achieve effective sealing. The soft metal seal members will also accommodate situations where the annular members are not of perfectly circular configuration since the soft metal seals will yield to accommodate such sealing surface irregularities.

Figure 8:
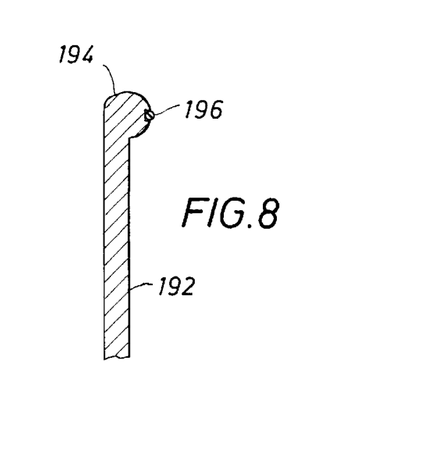
FIG. 8 is a partial sectional view of an annular seal body having a soft metal sealing insert located in an annular groove of an annular sealing lip having a generally circular or curved cross-sectional geometry.

In the partial sectional view of FIG. 8, an annular seal body 193 is provided with an annular sealing lip 194 which is of rounded or semi-circular cross-sectional configuration and projects radially from the annular seal body for sealing engagement with a cylindrical sealing surface, not shown. An annular soft metal seal member 196 is located within an annular seal retainer groove defined by the annular sealing lip and projects therefrom for interference sealing engagement with the cylindrical sealing surface.

Figure 9:
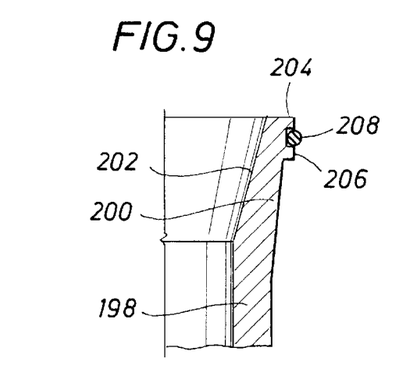
FIG. 9 is a partial sectional view of an annular seal body having a soft metal sealing insert located in annular sealing lip having an annular sealing face of substantially planar configuration.

In the partial sectional view of FIG. 9, an annular seal body 198 having a flexible tapered end section 200 defined by a chamfered surface 202. At the axial end of the tapered flexible end section is located an annular sealing lip 204 which projects radially from the annular seal body in a direction toward an annular surface. The annular sealing lip 204 is of generally rectangular cross-sectional configuration and defines a generally cylindrical or slightly curved outer peripheral surface 206. The annular sealing lip also defines an annular seal retention groove within which is located an annular soft metal seal insert 208. The annular seal retention groove may be of generally rectangular cross-sectional configuration as shown or may be of undercut cross-sectional configuration without departing from the spirit and scope of the present invention.

It should be borne in mind that the cross section of the soft metal insert for each of the embodiments of the invention set forth herein can be circular, elliptical, triangular, rectangular, or of polygonal and the seal grooves therefor may be of corresponding or differing cross-sectional configuration as desired. The soft metal sealing insert can be used on the sealing radii of Rough Casing Metal Seals, Externally Energized Metal Seals, Straight Bore Metal Seals (such as described in U.S. Pat. No. 4,471,965). Valve seats may be replaced with soft metal sealing inserts to minimize machining costs. Soft metal sealing inserts may also be used for ball valve seats, with no need to match lap the valve seat and ball to accomplish effective sealing. The sealing system of the present invention can be used for sealing on internal or external diameters with equal success. Also, seal designs can use multiple inserts (to increase contact area), or a single insert having a broad sealing surface. Existing seal designs can be modified efficiently and at low cost to accommodate the soft insert. Radial bumps of conventional metal-to-metal seals can be flattened and a grove added to simply fabrication of sealing components having soft metal sealing inserts.

Figure 10:
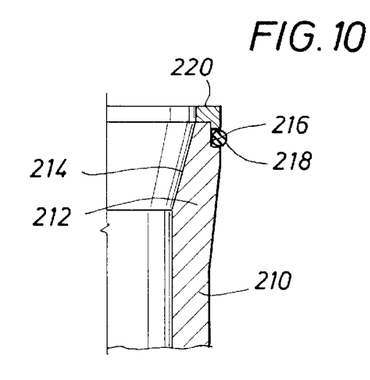
FIG. 10 is a partial sectional view of an annular flexible high strength metal seal body having a soft metal sealing insert located in an annular insert recess and being secured in assembly with the annular seal body by a retainer ring.

The partial sectional view of FIG. 10 illustrates an annular seal body structure 210 having at least one tapered flexible end section 212 which is defined by a chamfered surface 214 such as discussed above. The axial end or ends of the annular seal body define an annular seal recess 216 within which is located an annular soft metal seal element 218. A retainer ring 220, such as a snap ring, is received by the axial end of the annular seal body and serves to retain the soft metal sealing element 218 within the seal recess or groove. Thus, the annular soft metal seal is readily replaceable, so that the annular seal body can be reused even under circumstances where the annular soft metal seal might have become damaged during assembly, disassembly or during use.

Figure 11:
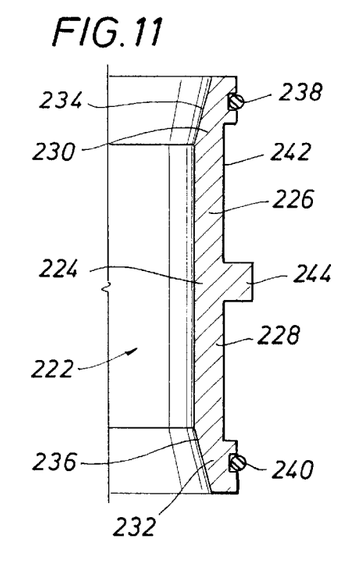
FIG. 11 is a partial sectional view of an annular flexible high strength metal seal body of generally cylindrical internal configuration and having a pair of soft metal sealing inserts located in annular insert grooves within respective extremities of the annular seal body.

Referring now to FIG. 11, the partial sectional view illustrates an annular seal body shown generally at 222, having a central body section 224 and intermediate body sections 226 and 228. Flexible axial end sections 230 and 232 of the annular seal body 222 are defined by annular chamfered surfaces 234 and 236. These flexible end sections are provided with annular seal retention grooves having soft metal sealing elements 238 and 240 retained therein. The soft metal sealing elements each define annular portions thereof which project radially beyond the annular surface 242 and establish interference sealing with an annular member. The annular surface 242 may be of cylindrical configuration and may extend completely to the axial ends of the annular seal body 222 as shown. In this case, the only portions of the seal assembly projecting radially beyond the cylindrical surface 242, except for an annular locator web 244, the purpose of which is explained above, are the sealing lips and portions of the soft metal sealing elements 238 and 240. During assembly of the annular seal body with annular surfaces, such as abutting pipe sections, the chamfered flexible axial ends of the annular seal body can be flexed by chamfered lead-in surfaces in the manner discussed above, to provide the annular seal body with preloaded spring-like characteristics upon assembly for continuous application of radially directed force to the annular soft metal seals to maintain them in interference sealing with the respective annular sealing surfaces contacted by the soft metal seals.

Figure 12:
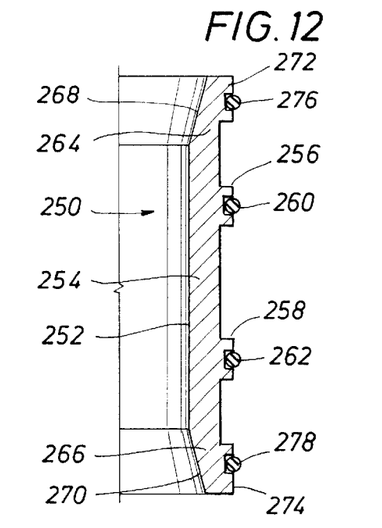
FIG. 12 is a partial sectional view of an annular flexible high strength metal seal body defining a plurality of internal annular sealing projections, ridges or bumps each defining an annular insert recess having an annular soft metal sealing insert retained therein for sealing engagement with a respective annular sealing surface.

FIG. 12 indicates that an annular sealing member shown generally at 250, embodying the principles of the present invention, may be provided with more than one or two annular soft metal sealing elements. The annular sealing member is defined by an annular seal body member 252 having a central body section 254 which defines circular sealing projections or lips 256 and 258 each defining an annular seal retainer groove having an annular soft metal seal element 260 and 262 located therein. The annular seal body is provided with flexible axial ends 264 and 266 which are defined by chamfered surfaces 268 and 270. These flexible axial ends also define annular projections or sealing lips 272 and 274 which have annular seal retention grooves containing annular soft metal seal members 276 and 278. Typically, the plurality of metal seal inserts of the annular sealing member 250 have the same internal or external dimension, so that multiple seals can be established on a cylindrical surface to enhance the sealing capability of the annular sealing unit. If desired, however, the intermediate seals and the axial end seals or each of the seal inserts may be of differing dimension according to the geometry of the surface or surfaces to be sealed. The annular seal member 250 is especially adaptable for use as a Straight Bore Metal Seal, with the plurality of annular soft metal seal inserts, thus enhancing the surface contact that is ordinarily possible when seals are used having only one or two soft metal seal inserts.

Figure 13:
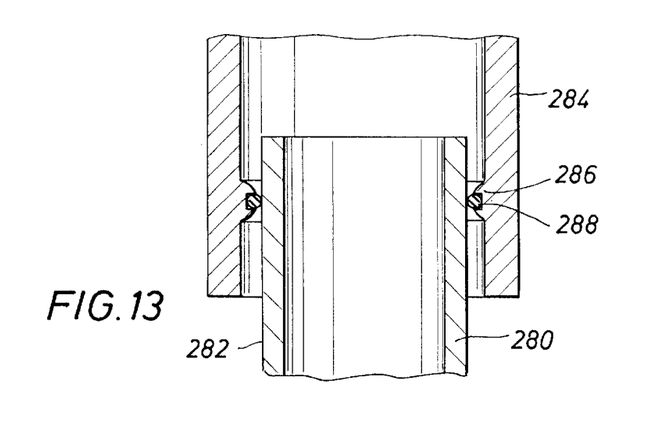
FIG. 13 is a fragmentary sectional view of a pair of an annular flexible high strength metal seal body having an annular internal sealing projection defining an annular seal recess containing an annular soft metal sealing insert and with the sealing insert shown in sealing engagement with an annular external sealing surface of a tubular member disposed in telescoping relation with the annular metal seal body.

As shown in FIG. 13, sealing according to the teachings of the present invention may be accomplished between telescopically arranged tubular elements. A tubular element 280 having a cylindrical external surface 282 is shown to be telescopically received within a tubular member 284. To accomplish sealing, the outer tubular member defines an internal annular sealing projection or lip 286 having an annular seal retention groove 288. An annular soft metal seal is retained within the annular seal retention groove, with an annular portion thereof projecting radially beyond the annular sealing projection 286 and thus disposed for sealing engagement with the outer cylindrical surface 282 of the tubular element 280. It should be borne in mind that the annular sealing lip may, in the alternative, be located at the outer periphery of the inner tubular element, causing the soft metal seal to be positioned for sealing engagement with the inner cylindrical surface of an outer tubular member.

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

We claim:

1. An annular metal-to-metal sealing system, comprising:
   at least one metal member defining an annular sealing surface;
   an annular seal body composed of high strength metal material being positioned in substantially concentric relation with said annular sealing surface and having at least one flexible portion defining an annular end being flexed during assembly and developing a seal activating force;
   an annular sealing lip projecting from said annular end and defining an annular seal recess; and
   at least one annular soft metal sealing insert being supported within said annular seal recess of said annular sealing lip and being maintained in sealing engagement with said annular sealing surface by said seal activating force of said at least one flexible portion of said annular seal body.

2. The annular metal-to-metal sealing system of claim 1, comprising:
   said at least one flexible portion of said annular seal body having spring characteristics and applying spring energy to said annular soft metal sealing insert for developing said seal activating force and energizing sealing engagement of said soft metal insert with said annular sealing surface.

3. The annular metal-to-metal sealing system of claim 1, comprising:
   an annular portion of said soft metal seal having an annular portion thereof projecting from said annular seal recess and having metal-to-metal sealing engagement with said annular sealing surface.

4. The annular metal-to-metal sealing system of claim 3, comprising:
   said annular seal recess being defined by an undercut groove of non-circular cross-sectional configuration; and
   said annular soft metal sealing insert having a cross-sectional configuration substantially conforming to said non-circular cross-sectional configuration and having an annular sealing portion thereof projecting from said undercut groove for metal-to-metal sealing engagement with said annular sealing surface.

5. The annular metal-to-metal sealing system of claim 1, comprising:
   said annular soft metal insert being plastically deformable by said seal activating force of said at least one flexible portion of said annular seal body to establish sealing engagement with surface irregularities of said annular sealing surface.

6. The annular metal-to-metal sealing system of claim 1, comprising:
said annular seal body having an elastic characteristic and becoming flexed during assembly with said annular sealing surface and establishing a spring force applying substantially constant radial sealing force to said annular soft metal seal for maintaining sealing thereof with said annular sealing surface.

7. The annular metal-to-metal sealing system of claim 1, comprising:
said annular soft metal insert being sufficiently elastically deformable by said spring force to establish metal-to-metal interference sealing engagement thereof with said annular sealing surface.

8. The annular metal-to-metal sealing system of claim 1, comprising:
said at least one soft metal insert being removable and replaceable with respect to said annular seal recess.

9. The annular metal-to-metal sealing system of claim 1, comprising:
said annular seal body defining at least one annular seal recess; and
said at least one soft metal insert being received within said annular seal recess with an annular portion thereof projecting from said annular seal recess for sealing engagement with said annular sealing surface.

10. The annular metal-to-metal sealing system of claim 1, comprising:
said at least one flexible portion of said annular seal body being of elastic character capable of being flexed and upon flexing during assembly with said annular sealing surface becoming spring loaded for substantially continuous application of spring force urging said annular soft metal insert against said annular sealing surface with sufficient force to establish interference sealing therewith, said spring force maintaining said annular soft metal insert in sealing engagement with said annular sealing surface during changes of dimension of said annular sealing surface.

11. The annular metal-to-metal sealing system of claim 10, comprising:
said at least one soft metal sealing insert being composed of corrosion resistant metal material.

12. The annular metal-to-metal sealing system of claim 10, comprising:
said at least one annular soft metal insert being plastically deformable against said annular sealing surface by said spring force and establishing a sufficiently broad sealing contact area with said annular sealing surface for metal-to-metal interference sealing with said annular sealing surface.

13. The annular metal-to-metal sealing system of claim 1, comprising:
said at least one metal member being a pair of substantially concentrically related annular metal members each defining an annular sealing surface, said annular sealing surfaces being disposed in spaced substantially concentric relation and defining an annulus therebetween and being in facing relation with one another;
said annular seal body substantially bridging said annulus and having a second annular sealing lip opposite of the at least one annular sealing lip, said annular sealing lips each defining an annular recess facing a respective one of said annular sealing surfaces;
said at least one annular soft metal sealing insert being at least a pair of annular soft metal sealing inserts being located within respective annular seal recesses with annular portions thereof projecting from said annular sealing recesses and having metal-to-metal interference sealing engagement with respective annular sealing surfaces.

14. The annular metal-to-metal sealing system of claim 1, comprising:
said at least one annular soft metal sealing insert being composed of corrosion resistant metal alloy having from ⅕ to ⅓ of the yield stress of said at least one metal member.

15. The annular metal-to-metal sealing system of claim 1, comprising:
said at least one annular soft metal sealing insert being composed of a soft metal material being compatible with environmental conditions to which said annular soft metal sealing insert is subjected.

16. The annular metal-to-metal sealing system of claim 1, comprising:
said at least one annular soft metal sealing insert having an effective sealing temperature range of from about −80° F. to about 450° F.

17. The annular metal-to-metal sealing system of claim 1, comprising:
said at least one metal member a pair of metal members each having a circular metal sealing surface, said circular metal sealing surfaces being radially spaced and being disposed in substantially concentric relation; and
said at least one flexible portion of said annular seal body being a pair of oppositely directed flexible portions each defining at least one annular sealing lip having at least one annular seal recess therein; and
said at least one annular soft metal sealing insert being at least a pair of annular soft metal sealing inserts being located within said at least one annular recess for respective metal-to-metal sealing with said radially spaced substantially concentric metal sealing surfaces.

18. An annular metal-to-metal sealing system, comprising:
a pair of metal members each defining at least one annular sealing surface;
an annular seal body composed of high strength flexible metal material and having a pair of opposed flexible sections each having spring characteristics and developing a spring force when flexed and each having at least one annular sealing lip positioned in substantially concentric relation with one of said annular sealing surfaces and having at least one annular seal retainer groove facing a respective annular sealing surface; and
at least one annular soft metal sealing insert being supported within said at least one seal retainer groove of said annular sealing lip and having an annular portion thereof projecting from said at least one annular seal retainer groove and maintained in metal-to-metal sealing engagement with said annular sealing surface by said spring force of said flexible sections of said annular seal body.

19. The annular metal-to-metal sealing system of claim 18, comprising:
said annular seal body being elastically deformed upon being placed in sealing assembly with said at least one metal member and developing said spring force; and
said at least one annular soft metal insert being plastically deformable by said spring force of said opposed flexible portions of said annular seal body to be deformed into and establish sealing engagement with surface irregularities of said annular sealing surfaces of said pair of annular metal members and to accommodate dimensional changes of said annular sealing surfaces by heat or pressure.

20. The annular metal-to-metal sealing system of claim 18, comprising:

said flexible portions of said annular seal body being of elastic character and being flexed during assembly with said annular sealing surfaces and upon flexing becoming spring loaded for substantially continuous application of spring force urging said annular soft metal sealing inserts against respective annular sealing surfaces with sufficient force to deform said annular soft metal sealing insert and form a broad annular sealing surface area thereon to establish metal-to-metal interference sealing with said respective annular sealing surfaces, said spring force maintaining said annular soft metal sealing inserts in sealing engagement with said annular sealing surfaces upon changes of dimension of said annular sealing surfaces.

21. The annular metal-to-metal sealing system of claim 18, comprising:

said at least one annular sealing surface being a pair of annular sealing surfaces disposed in substantially concentric spaced relation and defining an annulus therebetween;

said annular seal body substantially bridging said annulus and having at least a pair of annular seal body members each having opposed flexible portions and each having an annular sealing lip defining at least one annular seal recess facing a respective annular sealing surface; and a plurality of annular soft metal inserts being located within respective annular seal recesses with annular portions thereof having interference sealing engagement with respective annular sealing surfaces.

* * * * *